United States Patent
Shim et al.

(10) Patent No.: US 10,280,770 B2
(45) Date of Patent: May 7, 2019

(54) COATING SYSTEM INCLUDING OXIDE NANOPARTICLES IN OXIDE MATRIX

(71) Applicants: Rolls-Royce Corporation, Indianapolis, IN (US); Purdue Research Foundation, West Lafayette, IN (US)

(72) Inventors: Sungbo Shim, Irvine, CA (US); Sean E. Landwehr, Avon, IN (US); Stephanie Gong, Indianapolis, IN (US); Jeffrey P. Youngblood, Crawfordsville, IN (US); Rodney Trice, West Lafayette, IN (US)

(73) Assignees: Rolls-Royce Corporation, Indianapolis, IN (US); Purdue Research Foundation, West Lafayette, IN (US)

( * ) Notice: Subject to any disclaimer, the term of this patent is extended or adjusted under 35 U.S.C. 154(b) by 465 days.

(21) Appl. No.: 14/879,963

(22) Filed: Oct. 9, 2015

(65) Prior Publication Data
US 2016/0102407 A1    Apr. 14, 2016

Related U.S. Application Data

(60) Provisional application No. 62/061,986, filed on Oct. 9, 2014.

(51) Int. Cl.
*F01D 5/30* (2006.01)
*B05D 1/00* (2006.01)
(Continued)

(52) U.S. Cl.
CPC .......... *F01D 5/3092* (2013.01); *B05D 1/005* (2013.01); *C23C 18/127* (2013.01);
(Continued)

(58) Field of Classification Search
CPC .................. F01D 5/288; F01D 5/3092; F01D 2300/6033; C08K 2003/2244;
(Continued)

(56) References Cited

U.S. PATENT DOCUMENTS 3,874,915 A    4/1975 Ono et al.
4,332,618 A *  6/1982 Ballard .................. C04B 28/26
                                                                    106/605

(Continued)

OTHER PUBLICATIONS

Zheludkevich, Sol-gel coatings for corrosion protection of metals, (2005) Journal of Materials Chemistry, 15, pp. 5099-5111.*
(Continued)

*Primary Examiner* — Monique R Jackson
(74) *Attorney, Agent, or Firm* — Shumaker & Sieffert, P.A.

(57) ABSTRACT

In some examples, an article may include a substrate and a coating on the substrate. The substrate may include a superalloy, a ceramic, or a ceramic matrix composite. The coating may include a layer comprising a matrix material and a plurality of nanoparticles. The matrix material may include at least one of silica, zirconia, alumina, titania, or chromia, and the plurality of nanoparticles may include nanoparticles including at least one of yttria, zirconia, alumina, or chromia. In some examples, an average diameter of the nanoparticles is less than about 400 nm.

7 Claims, 4 Drawing Sheets

(51) Int. Cl.
  *F01D 5/28* (2006.01)
  *C23C 18/12* (2006.01)
  *C23C 28/04* (2006.01)

(52) U.S. Cl.
  CPC ...... *C23C 18/1216* (2013.01); *C23C 18/1254* (2013.01); *C23C 18/1283* (2013.01); *C23C 28/048* (2013.01); *F01D 5/282* (2013.01); *F01D 5/284* (2013.01); *F05D 2300/175* (2013.01); *F05D 2300/211* (2013.01); *F05D 2300/2118* (2013.01); *F05D 2300/6033* (2013.01); *Y02T 50/6765* (2018.05)

(58) Field of Classification Search
  CPC .... C08K 2003/2251; C08K 2003/2227; C08K 2201/003; C09D 183/00; C09D 183/04; C09D 183/06; C08G 77/00; C08G 77/04; C08G 77/18; C08L 83/00; C08L 83/04; C08L 83/06
  USPC .......... 416/219 R, 224, 220 R; 428/232, 325
  See application file for complete search history.

(56) References Cited

U.S. PATENT DOCUMENTS

| | | | |
|---|---|---|---|
| 4,397,901 A | 8/1983 | Warren | |
| 4,790,723 A * | 12/1988 | Wilson | C04B 37/008 416/213 R |
| 4,855,262 A | 8/1989 | Richon et al. | |
| 4,877,641 A | 10/1989 | Dory | |
| 4,877,651 A | 10/1989 | Dory | |
| 4,971,655 A | 11/1990 | Stefano et al. | |
| 5,534,308 A | 7/1996 | Bamberg et al. | |
| 5,897,920 A | 4/1999 | Sileo et al. | |
| 6,210,791 B1 * | 4/2001 | Skoog | C04B 41/009 106/286.5 |
| 6,335,105 B1 | 1/2002 | McKee | |
| 6,465,090 B1 * | 10/2002 | Stowell | C04B 41/009 416/241 B |
| 6,532,657 B1 | 3/2003 | Weimer et al. | |
| 6,641,907 B1 | 11/2003 | Merrill et al. | |
| 6,682,821 B2 | 1/2004 | Fukudome et al. | |
| 6,689,487 B2 | 2/2004 | Murphy | |
| 6,733,907 B2 | 5/2004 | Morrison et al. | |
| 6,893,750 B2 | 5/2005 | Nagaraj et al. | |
| 6,926,928 B2 | 8/2005 | Ackerman et al. | |
| 6,976,532 B2 | 12/2005 | Zhan et al. | |
| 7,306,828 B2 | 12/2007 | Barrera et al. | |
| 7,604,867 B2 * | 10/2009 | Hazel | C03C 1/006 428/325 |
| 7,629,033 B2 | 12/2009 | Hongo et al. | |
| 7,666,515 B2 | 2/2010 | Nagaraj et al. | |
| 7,730,808 B2 | 6/2010 | Chiu et al. | |
| 7,763,367 B2 | 7/2010 | Arndt et al. | |
| 7,942,638 B2 | 5/2011 | Eichmann et al. | |
| 8,012,252 B2 | 9/2011 | Engler et al. | |
| 8,021,758 B2 | 9/2011 | Sambasivan et al. | |
| 8,034,153 B2 | 10/2011 | Marchiando et al. | |
| 8,163,382 B2 * | 4/2012 | Kasai | C03B 19/12 428/323 |
| 8,361,627 B2 | 1/2013 | Hack et al. | |
| 8,486,520 B2 | 7/2013 | Lima et al. | |
| 8,512,871 B2 | 8/2013 | Persky et al. | |
| 8,721,812 B2 | 5/2014 | Furrer et al. | |
| 9,397,359 B2 * | 7/2016 | Boy | C04B 41/89 |
| 2005/0037227 A1 * | 2/2005 | Endo | C09D 5/084 428/624 |
| 2005/0282020 A1 * | 12/2005 | Stowell | C23C 24/08 428/446 |
| 2006/0188736 A1 | 8/2006 | Luthra et al. | |
| 2006/0292345 A1 * | 12/2006 | Dave | C03C 17/001 428/141 |
| 2007/0049484 A1 * | 3/2007 | Kear | B82Y 30/00 501/103 |
| 2007/0099027 A1 | 5/2007 | Krishnamurthy et al. | |
| 2007/0128447 A1 | 6/2007 | Hazel et al. | |
| 2007/0184298 A1 | 8/2007 | Ochiai et al. | |
| 2007/0224359 A1 | 9/2007 | Burin et al. | |
| 2007/0228664 A1 | 10/2007 | Anand et al. | |
| 2008/0038578 A1 | 2/2008 | Li | |
| 2008/0193657 A1 * | 8/2008 | Raybould | C23C 18/04 427/397.7 |
| 2008/0245260 A1 * | 10/2008 | Campazzi | B82Y 30/00 106/14.41 |
| 2008/0304974 A1 * | 12/2008 | Marshall | F01D 5/02 416/223 R |
| 2009/0202815 A1 * | 8/2009 | Campazzi | B82Y 30/00 428/328 |
| 2009/0214787 A1 | 8/2009 | Wei et al. | |
| 2010/0119718 A1 | 5/2010 | Tulyani et al. | |
| 2010/0178169 A1 * | 7/2010 | Webb | F01D 5/087 416/95 |
| 2010/0212541 A1 * | 8/2010 | Jabado | B82Y 30/00 106/14.05 |
| 2011/0111211 A1 * | 5/2011 | Golecki | C04B 35/803 428/329 |
| 2011/0124253 A1 | 5/2011 | Shah et al. | |
| 2012/0114956 A1 | 5/2012 | Ochiai et al. | |
| 2012/0251742 A1 | 10/2012 | Kerber | |
| 2013/0004309 A1 | 1/2013 | Sambasivan et al. | |
| 2013/0177772 A1 | 7/2013 | Schaeffer et al. | |

OTHER PUBLICATIONS

Buehler, MSDS for MICROPOLISH II Alumina Powder, Apr. 2012.*

Pin, Reinforced sol-gel thermal barrier coatings and their cyclic oxidation life, (2013) Journal of the European Ceramic Society, vol. 33 (2) pp. 269-276.*

* cited by examiner

COATING SYSTEM INCLUDING OXIDE NANOPARTICLES IN OXIDE MATRIX

RELATED APPLICATIONS

This application claims the benefit of U.S. Provisional Application No. 62/061,986, titled, "COATING SYSTEM INCLUDING OXIDE NANOPARTICLES IN OXIDE MATRIX," filed Oct. 9, 2014, the entire content of which is incorporated herein by reference.

TECHNICAL FIELD

The disclosure relates to coatings for superalloy substrates, ceramic substrates, or ceramic matrix composite substrates.

BACKGROUND

Gas turbine engines include compressor blades that rotate to compress inlet gases and turbine blades that rotate to harness energy from expansion of outlet gases. Gas turbine engine blades are attached to gas turbine engine disks. The gas turbine engine disks rotate with the gas turbine engine blades and may experience peak stresses in excess of about 1000 megapascals (MPa) due to centrifugal loading from the gas turbine engine blades and weight of the gas turbine engine disks themselves.

In some examples, gas turbine engine disks may not be directly exposed to the flow path of hot gases in the gas turbine engine. Thus, in some implementations, maximum surface temperatures of the gas turbine engine disks may be about 650° C. The thermal and mechanical stresses to which the gas turbine engine disks are exposed impose design criteria which the alloys that form the gas turbine engine disks may satisfy. These design criteria include relatively high yield strength and tensile strength to inhibit yield and fracture of the gas turbine disk, relatively high ductility and fracture toughness to impart tolerance to defects, relatively high resistance to initiation of fatigue cracks, and relatively low fatigue crack propagation rates. In some implementations, gas turbine disks may be formed from nickel (Ni)-based superalloys, which may satisfy at least some of these design criteria.

In some examples, gas turbine engines may include some components formed from alloys and some components formed from ceramics or ceramic matrix composites (CMCs). The alloy components and ceramic or CMC composites may contact each other.

SUMMARY

The disclosure describes an article that includes a substrate and a coating including a layer including oxide nanoparticles in an oxide matrix. The oxide matrix may include a ceramic material, such as at least one of silica, zirconia, alumina, titania, or chromia. Similarly, the oxide nanoparticles may include ceramic nanoparticles, such as at least one of yttria, zirconia, alumina, or chromia. In some examples, the chemical composition of the oxide nanoparticles may be different from the chemical composition of the oxide matrix, which may result in the oxide nanoparticles forming a second, distinct phase in the first phase of the oxide matrix.

In some examples, the article includes a gas turbine engine disk, e.g., a compressor disk or a turbine disk. The coating may be applied to one or more portions of the gas turbine engine disk, such surfaces of the fir tree recess, a surface of a diaphragm of the gas turbine engine disk, or a surface of an outer rim of the gas turbine engine disk. The coating may be a wear-resistant coating or provide hot corrosion protection, oxidation protection, or both to the gas turbine engine disk.

In some examples, a system may include an alloy component in contact with a ceramic or CMC component. One or both of the alloy component may include the coating that includes alternating layers including amorphous microstructure. The coating may be on the alloy component, the ceramic or CMC component, or both, at portions of the component(s) that contact each other. In some examples, the coating may reduce or substantially prevent diffusion of silicon from the ceramic or CMC component into the alloy component.

In some examples, the disclosure describes an article including a substrate and a coating on the substrate. In accordance with these examples, the coating may include a layer including a matrix material and a plurality of nanoparticles. In some examples, the matrix material may include at least one of silica, zirconia, alumina, titania, or chromia, and the plurality of nanoparticles may include nanoparticles comprising at least one of yttria, zirconia, alumina, or chromia. An average diameter of the nanoparticles may be less than about 400 nm.

In some examples, the disclosure describes a system including a first component including an alloy substrate and a second component including a ceramic or a CMC substrate. In accordance with these examples, at least a portion of the first component is in contact with at least a portion of the second component, and the at least a portion of the first component, the at least a portion of the second component, or both comprises a coating. In some examples, the coating may include a layer including a matrix material and a plurality of nanoparticles. In some examples, the matrix material may include at least one of silica, zirconia, alumina, titania, or chromia, and the plurality of nanoparticles may include nanoparticles comprising at least one of yttria, zirconia, alumina, or chromia. An average diameter of the nanoparticles may be less than about 400 nm.

In some examples, the disclosure describes a method including applying a layer of a sol comprising an oxide matrix precursor and a plurality of nanoparticles by at least one of air spraying, spin coating, or dip coating. In some examples, the oxide matrix precursor may include a precursor of at least one of silica, zirconia, alumina, titania, or chromia, and the plurality of nanoparticles may include at least one of yttria, zirconia, alumina, or chromia. The method also may include curing the layer to form a gel, and sintering the layer to form a layer comprising an oxide matrix and the plurality of nanoparticles, wherein the oxide matrix comprises at least one of silica, zirconia, alumina, titania, or chromia.

The details of one or more examples are set forth in the accompanying drawings and the description below. Other features, objects, and advantages will be apparent from the description and drawings, and from the claims.

DETAILED DESCRIPTION

Figure 1:
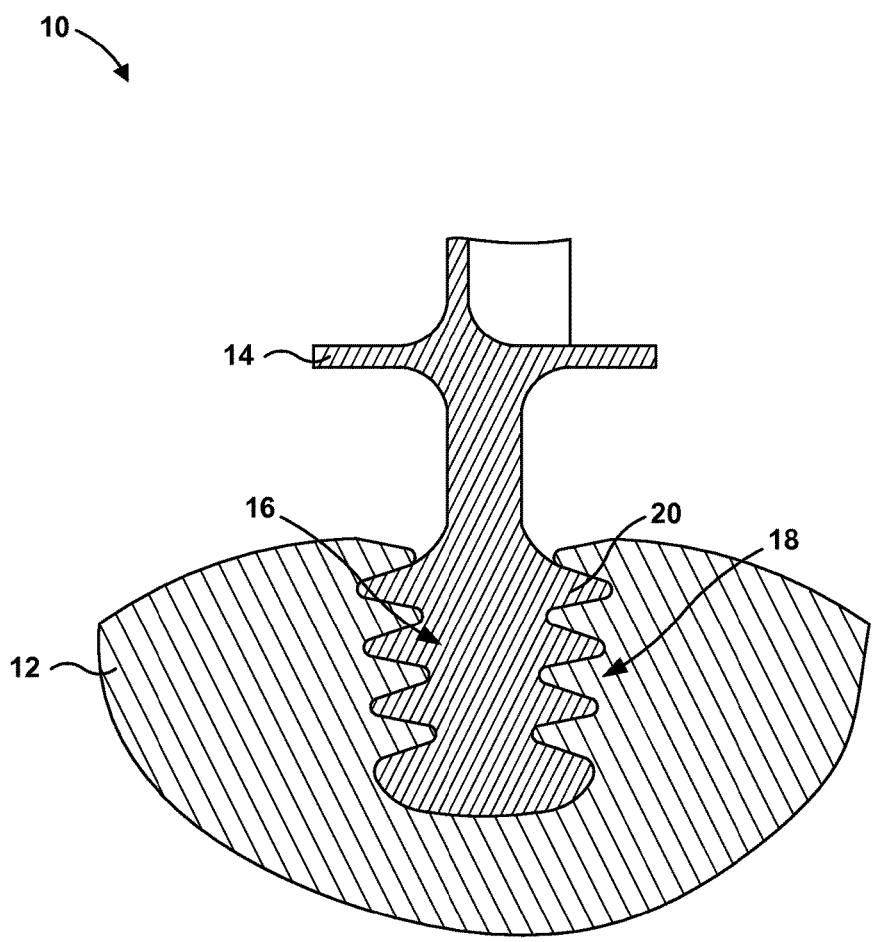
FIG. 1 is a conceptual diagram illustrating a cross-sectional view of an example article that includes a gas turbine engine disk and a gas turbine engine blade.

The disclosure describes an article that includes a substrate and a coating including a layer including oxide nanoparticles in an oxide matrix. The oxide matrix may include a ceramic material, such as at least one of silica, zirconia, alumina, titania, or chromia. Similarly, the oxide nanoparticles may include ceramic nanoparticles, such as at least one of yttria, zirconia, alumina, or chromia. In some examples, the chemical composition of the oxide nanoparticles may be different from the chemical composition of the oxide matrix, which may result in the oxide nanoparticles forming a second, distinct phase in the first phase of the oxide matrix.

The chemical composition of the oxide nanoparticles may be selected to provide or modify predetermined properties of the layer of the coating. For example, the chemical composition of the oxide nanoparticles may be selected to provide or modify at least one of the coefficient of thermal expansion (CTE) of the layer, the chemical properties of the layer, or the mechanical properties of the layer. For example, the chemical composition of the oxide nanoparticles may be selected to modify the environmental barrier properties provided by the layer to the underlying substrate. In some examples, the chemical composition of the oxide nanoparticles also may be based upon the chemical composition of the oxide matrix, such that any mismatch between the CTE of the oxide nanoparticles and the CTE of the matrix material is not sufficient to cause cracking in the layer at the interface of the oxide nanoparticles and the oxide matrix.

In some examples, an average diameter of the oxide nanoparticles may be less than about 400 nanometers (nm). The average diameter of the oxide nanoparticles may influence formation of cracks during formation of the layer. Additionally, in some examples, the layer may be deposited from a sol-gel. The size of the nanoparticles may influence the formation and control of the sol-gel.

In some examples, the article includes a gas turbine engine disk, e.g., a compressor disk or a turbine disk. The coating may be applied to one or more portions of the gas turbine engine disk, such surfaces of the fir tree recess, a surface of a diaphragm of the gas turbine engine disk, or a surface of an outer rim of the gas turbine engine disk. In some examples, the coating may be reduce wear between the gas turbine engine disk and a gas turbine engine blade or vane. In other examples, the coating may provide hot corrosion protection, oxidation protection, or both to the gas turbine engine disk.

In some examples, a system, such as a high temperature mechanical system, may include an alloy component in contact with a ceramic or CMC component. One or both of the alloy component or the ceramic or CMC component may include the coating that includes a layer including an oxide matrix material and a plurality of oxide nanoparticles. The coating may be on the alloy component, the ceramic or CMC component, or both, at portions of the component(s) that contact each other. In some examples, the coating may reduce or substantially prevent diffusion of silicon from the ceramic or CMC component into the alloy component.

FIG. 1 is a conceptual diagram illustrating a cross-sectional view of an example article 10 that includes a gas turbine engine disk 12 and a gas turbine engine blade 14. In gas turbine engines, turbine blades 14 may be connected to turbine disks 12 using fir tree connections. In such connections, each gas turbine engine blade 14 has a dovetail or blade root 16 that is inserted into a fir tree recess 18 formed in gas turbine engine disk 12. The facing sides of blade root 16 and fir tree recess 18 have respective serrations 20, which may take the form of projections and grooves extending in the direction of insertion of blade root 16 into fir tree recess 18. In this way, the fir tree connection may prevent gas turbine engine blade 14 from flying outwardly from gas turbine engine disk 12 during operation of the gas turbine engine and rotation of gas turbine engine blade 14 and disk 12.

Surfaces of blade root 16 and fir tree recess 18 form contact points between gas turbine engine disk 12 and gas turbine engine blade 14. During operation of the gas turbine engine, gas turbine engine disk 12 and gas turbine engine blade 14 may rub against each other at these contact points due to relative motion between gas turbine engine disk 12 and gas turbine engine blade 14. In some examples, the rubbing between gas turbine engine disk 12 and gas turbine engine blade 14 at these contact points may result in fretting.

In accordance with some examples of this disclosure, a coating may be applied to a gas turbine engine disk 12. In some examples, the coating may be selectively applied to gas turbine engine disk 12 at points of contact between gas turbine engine disk 12 and gas turbine engine blade 14. For example, the coating may be applied to the surface of fir tree recess 18. The coating may include a layer including an oxide matrix material and a plurality of oxide nanoparticles. For example, the oxide matrix material may include at least one of silica, zirconia, alumina, titania, or chromia. In some examples, the oxide nanoparticles may include at least one of zirconia, yttria, alumina, or chromia.

The coating may be resistant to mechanical wear due to rubbing between fir tree recess 18 of gas turbine engine disk 12 and gas turbine engine blade 14. In some examples, this may reduce fretting of gas turbine engine disk 12, gas turbine engine blade 14, or both. In some examples, the coating is selectively not on surfaces of gas turbine disk 12 other than the surfaces of fir tree recess 18.

In some examples, instead of or in addition to being on the surface of fir tree recess 18, the coating may be applied to other portions of gas turbine engine disk 12. For example, the coating may be applied to a portion of gas turbine engine disk 12 that is exposed to hot gases during operation of the gas turbine engine. These portions of gas turbine engine disk 21 may include a diaphragm, an outer rim, or both. In some examples, the coating may provide hot corrosion resistance, oxidation protection, or both to gas turbine engine disk 12.

Figure 2:
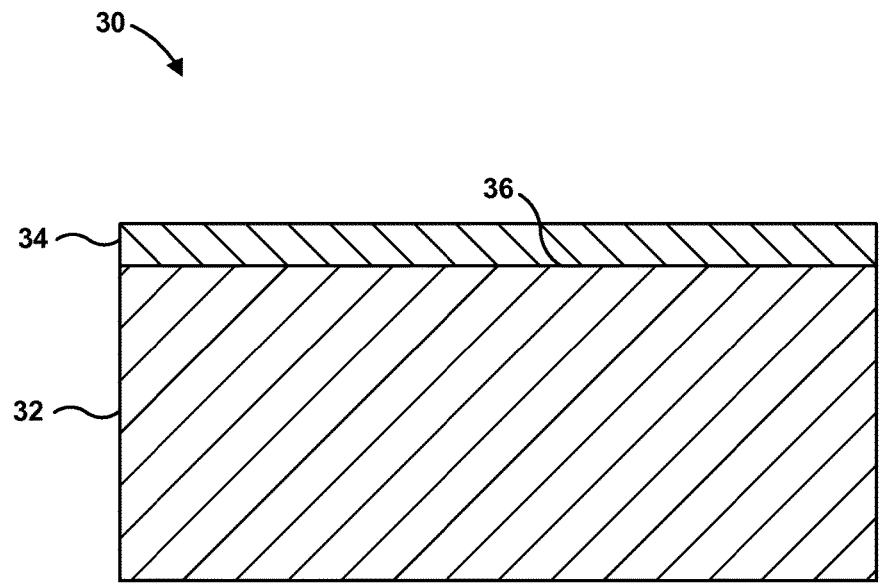
FIG. 2 is a conceptual diagram illustrating a cross-sectional view of an example article that includes a substrate and a coating including a layer including oxide nanoparticles in an oxide matrix.

FIG. 2 is a conceptual diagram illustrating a cross-sectional view of an example article 30 that includes a substrate 32 coated with a coating 34. In some examples, article 30 may be an example of gas turbine engine disk 12, such as a portion of fir tree recess 18, a diaphragm of gas turbine engine disk 12, or an outer rim of gas turbine engine disk 12. In the example illustrated in FIG. 2, coating 34 includes a single layer.

In some examples, substrate 32 may include a superalloy, such as a Ni-based or Co-based superalloy. In some examples, substrate 32 includes a Ni-based superalloy suitable for use in a gas turbine engine disk or gas turbine engine spacer. As described above, the superalloy from which a gas turbine engine disk is formed may satisfy certain design criteria, including, for example, relatively high yield strength and tensile strength to inhibit yield and fracture of the gas turbine engine disk, relatively high ductility and fracture toughness to impart tolerance to defects, relatively high resistance to initiation of fatigue cracks, and relatively low fatigue crack propagation rates.

Properties of the superalloy from which substrate 32 is formed may be a function of the composition of the superalloy and the phase constitution and microstructure of the superalloy. The microstructure of the superalloy may include the grain size of the superalloy and a precipitate phase composition, size, and volume fraction. In some examples, the phase constitution and microstructure of the superalloy may be affected by mechanical and thermal processing of the superalloy. For example, thermal processing, e.g., heat treatment, of the superalloy may affect grain structure of the superalloy, precipitate phase size and/or composition, or the like.

In some examples, substrate 32 includes a polycrystalline Ni-based superalloy, which includes a plurality of grains. Substrate 32 may include at least one of Al, Ti, or Ta in addition to Ni. In some examples, a concentration of elements, such as between about 2 weight percent (wt. %) and about 5 wt. % Al, between about 2 wt. % and about 5 wt. % Ti, and less than about 3 wt. % tantalum (Ta), in substrate 32 may be sufficient to result in gamma-prime (γ') precipitate formation in substrate 32. For example, the concentration of Al, Ti, and/or Ta in substrate 32 may result in a γ' precipitate phase volume fraction between about 40 volume percent (vol. %) and about 55 vol. %. In some instances, higher or lower elemental contents of the individual gamma prime forming elements can be employed while maintaining the overall gamma prime phase fraction at desired levels for properties such as strength and ductility. The volume fraction, size, and distribution of the γ' precipitate phase may be influenced by the alloy composition, heat treatment temperature, heat treatment duration, and cooling rate during heat treatment. Additionally, substrate 32 may include grain sizes between about 5 micrometers (μm) in diameter to between about 30 μm and about 50 μm or more in diameter, engineered for a combination of yield strength, resistance to fatigue crack initiation, creep strength, and resistance to fatigue crack growth. In some examples, substrate 32 may include additional elements that segregate to grain boundaries of substrate 32. The segregating elements may affect creep resistance and low-cycle fatigue resistance of substrate 32. Examples of segregating elements include boron (B; up to about 0.03 weight percent (wt. %) of substrate 12), carbon (C; up to about 0.05 wt. % of substrate 32), and zirconium (Zr; up to about 0.1 wt. % of substrate 32). Examples of compositions and heat treatment techniques that may result in suitable Ni-based disk alloys are described in U.S. patent application Ser. No. 12/755,170, entitled "TECHNIQUES FOR CONTROLLING PRECIPITATE PHASE DOMAIN SIZE IN AN ALLOY," and filed Apr. 6, 2010, the entire content of which is incorporated herein by reference.

In an example, substrate 32 may include a Ni-based superalloy with a composition of about 15 wt. % Cr, about 18.5 wt. % Co, about 5 wt. % Mo, about 3 wt. % Al, about 3.6 wt. % Ti, about 2 wt. % Ta, about 0.5 wt. % Hf, about 0.06 wt. % Zr, about 0.027 wt. % C, about 0.015 wt. % B, and a balance Ni (about 52.3 wt. % Ni).

Example superalloys include RR1000 (a Ni-based superalloy containing about 52.4 mass percent (mas. %) Ni, about 15 mas. % Cr, about 18.5 mas. % Co, about 5 mas. % Mo, about 3.6 mas. % Ti, about 3 mas. % Al, about 2 mas. % Ta, about 0.5 mas. % Hf, and about 0.03 mas. % C); UDIMET® alloy 720, available from Special Metals Corporation (a Ni-based alloy including between 15.5 and 16.5% Cr, between 14 and 15.5% Co, between 2.75 and 3.25% Mo, between 1.00 and 1.50% W, between 4.75 and 5.25% Ti, between 2.25 and 2.75% Al, between 0.01 and 0.02% C, between 0.025 and 0.05% Zr, between 0.01 and 0.02% B, and a balance Ni); those available from Martin-Marietta Corp., Bethesda, Md., under the trade designation MAR-M247; those available from Cannon-Muskegon Corp., Muskegon, Mich., under the trade designation CMSX-3 and CMXS-4; and the like.

In other examples, substrate 32 may include a ceramic or ceramic matrix composite. In some examples in which substrate 32 includes a ceramic, the ceramic may be substantially homogeneous. In some examples, a substrate 32 that includes a ceramic includes, for example, a Si-containing ceramic, such $SiO_2$, silicon carbide (SiC) or silicon nitride ($Si_3N_4$); $Al_2O_3$; aluminosilicate (e.g., $Al_2SiO_5$); or the like. In other examples, substrate 32 includes a metal alloy that includes Si, such as a molybdenum-silicon alloy (e.g., $MoSi_2$) or a niobium-silicon alloy (e.g., $NbSi_2$).

In examples in which substrate 32 includes a CMC, substrate 32 includes a matrix material and a reinforcement material. The matrix material includes a ceramic material, such as, for example, SiC, $Si_3N_4$, $Al_2O_3$, aluminosilicate, $SiO_2$, or the like. The CMC further includes a continuous or discontinuous reinforcement material. For example, the reinforcement material may include discontinuous whiskers, platelets, or particulates. As other examples, the reinforcement material may include a continuous monofilament or multifilament weave. In some examples, substrate 32 may include a SiC reinforcement material in a SiC matrix material.

Coating 34 may include a layer (e.g., at least one layer) including an oxide matrix material and a plurality of oxide nanoparticles. The oxide matrix may include at least one ceramic material, such as at least one of silica, zirconia, alumina, titania, or chromia. In some examples, the oxide matrix may include a mixture of two or more oxides, such as a mixture of silica and zirconia. The oxide matrix material may contribute to hot corrosion resistance, oxidation protection, or both, provided by coating 34 to substrate 32.

The oxide nanoparticles may include ceramic nanoparticles, such as at least one of yttria, zirconia, alumina, or chromia. In some examples, the oxide nanoparticles may include yttria stabilized with at least one other oxide, such as at least one of yttria, alumina, or chromia. In some examples, when the at least one other oxide is present in the oxide nanoparticles, the oxide nanoparticles may include between about 1 wt. % and about 10 wt. % of the at least one other oxide. In some examples, the at least one other oxide may be present in the oxide nanoparticles in a concentration of about 3 mol. %. In some examples, the chemical composition of the oxide nanoparticles may be different from the chemical composition of the oxide matrix, which may result in the oxide nanoparticles forming a second, distinct phase in the first phase of the oxide matrix.

The chemical composition of the oxide nanoparticles may be selected to provide or modify one or more predetermined properties of the layer of the coating. In some examples, the chemical composition of the oxide nanoparticles also may be based upon the chemical composition of the oxide matrix, such that any mismatch between the CTE of the oxide nanoparticles and the CTE of the matrix material is not sufficient to cause cracking in the layer at the interface of the oxide nanoparticles and the oxide matrix.

In some examples, the chemical composition of the oxide nanoparticles may be selected to modify at least one of the coefficient of thermal expansion (CTE) of the layer of coating 34. Too large of a mismatch between the CTE of coating 34 and substrate 32 may generate stress in coating 34, substrate 32, or both near surface 36 of substrate due to differential expansion and contraction of substrate 32 and coating 34 during thermal cycling. Because of this, it may be beneficial to form coating 34 of materials that, together, give an effective CTE to coating 34 that is sufficiently close to the CTE of substrate 32. For example, the effective CTE of coating 34 may be within about 25% of the CTE of substrate 32. The nanoparticles may have a different CTE than the matrix material, and thus may modify the CTE of coating 34. For example, the CTE of coating 34 may be approximately equal to the volume-weighted average CTE of the nanoparticles and the matrix material. In this way, the nanoparticles may facilitate matching or near matching of the CTEs of substrate 32 and coating 34.

In some examples, the chemical composition of the oxide nanoparticles may be selected to modify the environmental barrier properties provided by the layer to the underlying substrate. For example, the chemical composition of the oxide nanoparticles may affect the corrosion resistance, oxidation resistance, or both of coating 34.

In some examples, an average diameter of the oxide nanoparticles may be less than about 400 nanometers (nm), such as less than about 100 nm, or about 90 nm. The average diameter of the oxide nanoparticles may influence formation of cracks during formation of the layer of coating 34. Additionally, in some examples, the layer may be deposited from a sol-gel. The size of the nanoparticles may influence the formation and control of the sol-gel. Additionally or alternatively, the size of the oxide nanoparticles may affect the mechanical properties of coating 34, such as toughness, crack propagation, or the like. In some examples, the oxide nanoparticles may be disposed throughout coating 34 substantially homogeneously, and substantially no (e.g., no or nearly no) nanoparticles may be agglomerated in clumps of nanoparticles.

As described above, the volume fraction of the oxide nanoparticles in coating 34 also may influence properties of coating 34, including the CTE of coating 34, environmental barrier properties, and the like. In some examples, the concentration of nanoparticles in the layer of coating 34 may be defined based on the concentration of nanoparticles in the mixture from which the layer is formed. For example, nanoparticles may be present in the mixture from which the layer is formed at a concentration of between about 0.7 volume percent (vol. %) and about 13 vol. %, based on the volume of nanoparticles divided by the total volume of nanoparticles plus matrix material precursor. In some examples, the nanoparticles may be present in the mixture from which the layer of coating 34 is formed at a concentration of between about 5 vol. % and about 7.5 vol. %, based on the volume of nanoparticles divided by the total volume of nanoparticles plus matrix material precursor.

In some examples, the plurality of nanoparticles may reduce cracking in coating 34 under stress, such as thermal cycling or contact with another component, compared to a coating including a homogeneous matrix material.

Figure 3:
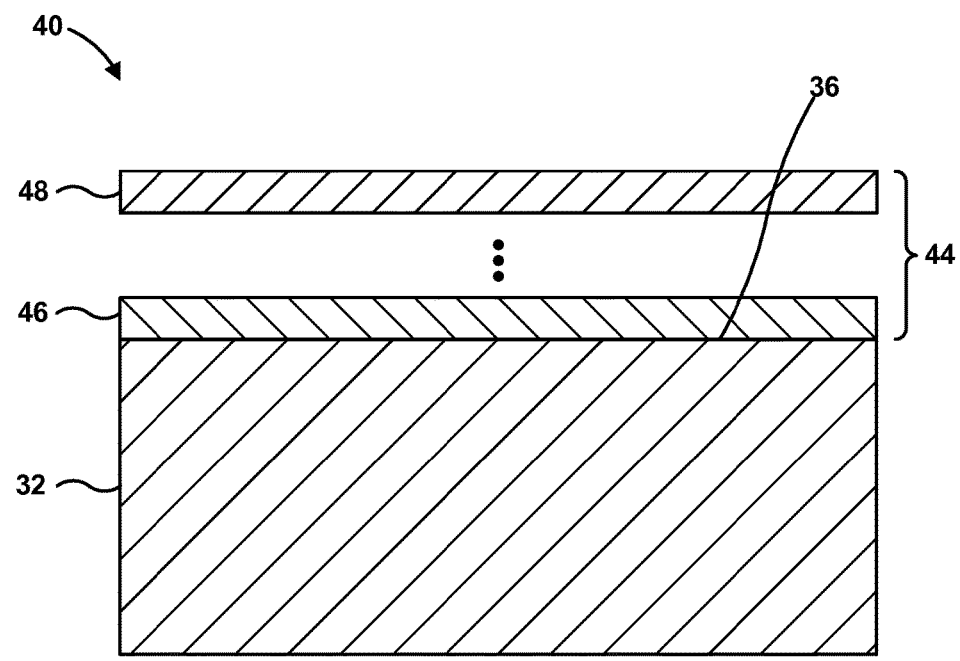
FIG. 3 is a conceptual diagram illustrating a cross-sectional view of another example article that includes a substrate and a coating including a layer including oxide nanoparticles in an oxide matrix.

In some examples, rather than being formed as a single layer, a coating may include a plurality of layers. FIG. 3 is a conceptual diagram illustrating a cross-sectional view of another example article 40 that includes a substrate 32 and a coating 44 including a plurality of layers 46-48.

Substrate 32 may be similar to or substantially the same as substrate 32 described with respect to FIG. 2. Similarly, article 40 may be an example of gas turbine engine disk 12, such as a portion of fir tree recess 18, a diaphragm of gas turbine engine disk 12, or an outer rim of gas turbine engine disk 12.

Each of plurality of layers 46-48 may include an oxide matrix material and a plurality of oxide nanoparticles. In some examples, each of layers 46 may be of substantially the same chemical composition (for both the oxide matrix material and oxide nanoparticles), with substantially the same volume fraction of oxide nanoparticles, and the same size of oxide nanoparticles. In other examples, at least one of layers 46-48 may have at least one property that is different than at least one property of at least one other of layers 46-48. The properties that may be the same or different between layers 46-48 include the chemical composition of the oxide matrix material, the chemical composition of the oxide nanoparticles, the size of the oxide nanoparticles, the volume fraction of the oxide nanoparticles, the thickness of the layer, or the like.

The properties of each layer of layers 46-48 may be selected to provide predetermined properties to coating 44. For example, the chemical composition of the oxide matrix material, the chemical composition of the oxide nanoparticles, and the volume fraction of oxide nanoparticles may be selected such that layer 46 in FIG. 3 has a CTE substantially the same (e.g., the same or nearly the same) as the CTE of substrate 32. As another example, the chemical composition of the oxide matrix material, the chemical composition of the oxide nanoparticles, and the volume fraction of oxide nanoparticles may be selected such that layer 48 in FIG. 48 possesses at least one of hot corrosion resistance, oxidation resistance, or wear resistance, depending on the application of coating 44.

In some examples, coating 44 may include between 1 layer and about 20 layers, such as between 3 layers and 10 layers. Forming coating 44 of a plurality of layers 46-48 may reduce residual stress (e.g., stress due to the coating process) in coating 44, e.g., compared to forming coating 44 of a single thick layer. In some examples, coating 44 may be applied using a sol-gel technique. In a sol-gel technique, each of layers 46-48 is applied from a slurry, then dried. In examples in which coating 44 is applied as a single, thick layer, cracking may occur during drying of coating 44. Applying coating 44 as a plurality of relatively thinner layers 46-48 may reduce or substantially eliminate cracking during the drying process.

Additionally or alternatively, in some examples, each of layers 46-48 may include different compositions. By including layers 46-48 with different compositions, crack mitigation within coating 44 may be reduced, e.g., due to the interfaces between layers 46-48. In some examples, by forming coating 44 with multiple layers, the thicknesses of the individual layers may be reduced while providing the same total thickness for coating 44.

Coating 34 or 44 may define a total thickness, measured in a direction normal to surface 36 of substrate 32, of between about 1 micrometers and about 25 micrometers. For example, coating 34 or 44 may define a total thickness of between about 1 micrometer and about 10 micrometers. In some examples, each of layers 46-48 defines a thickness, measured in a direction normal to surface 36 of substrate 32, of between about 0.1 micrometer and about 10 micrometers, such as between about 1 micrometer and about 5 micrometers. In some examples, the thickness of each of layers 46-48 may be substantially the same (e.g., the same or nearly the same). In other examples, the thickness of at least one of layers 46-48 may be different than the thickness of at least another of layers 46-48.

In some examples, coatings 34 or 44 may be resistant to mechanical wear due to rubbing between article 30 or 40, respectively, and another component. For example, coatings 34 or 44 may be applied on fir tree recess 18 of gas turbine engine disk 12, and may reduce fretting of gas turbine engine disk 12, gas turbine engine blade 14, or both.

In some examples, coatings 34 or 44 may be applied to other portions of gas turbine engine disk 12. For example, coatings 34 or 44 may be applied to a portion of gas turbine engine disk 12 that is exposed to hot gases during operation of the gas turbine engine. These portions of gas turbine engine disk 21 may include a diaphragm, an outer rim, or both. In some examples, coatings 34 or 44 may provide hot corrosion resistance, oxidation protection, or both to gas turbine engine disk 12.

Figure 4:
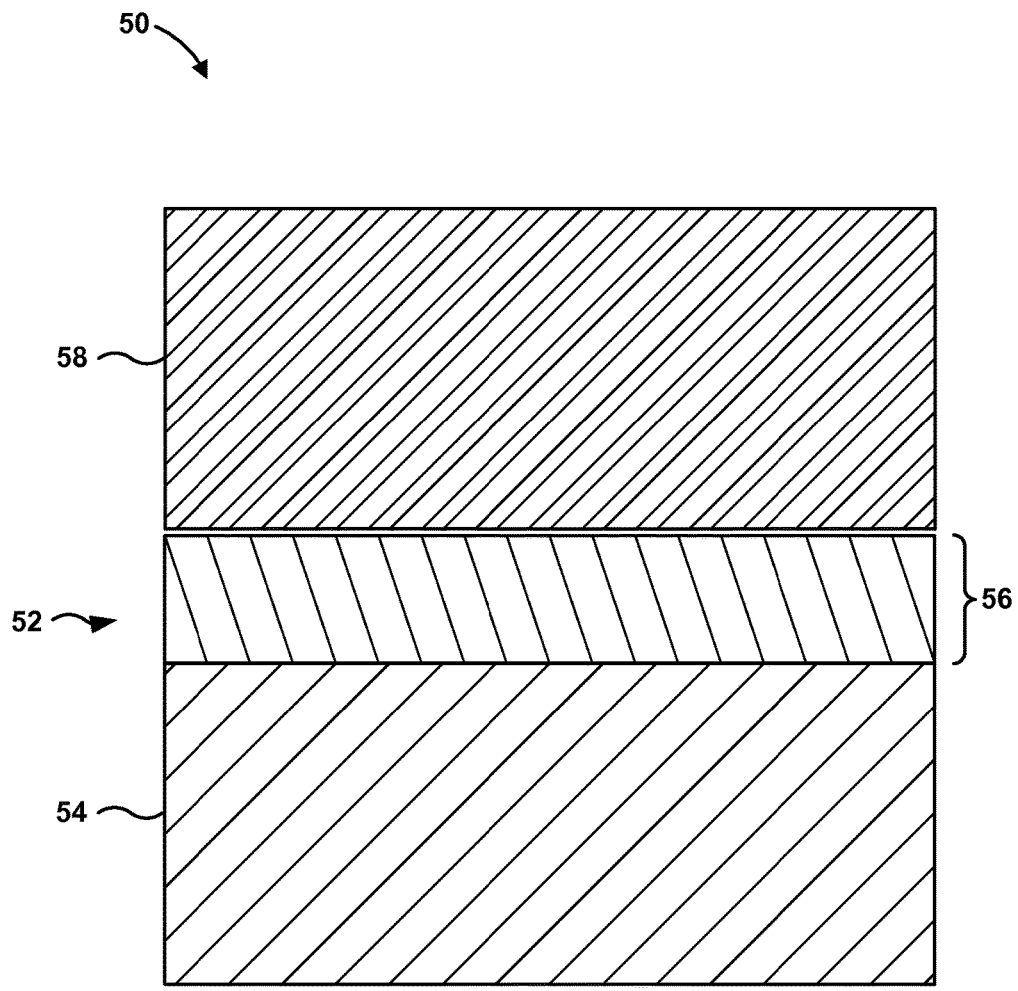
FIG. 4 is a conceptual and schematic block diagram of a system including a first component and a second component that may come into contact with each other.

In some examples, a coating including at least one layer including oxide matrix material and oxide nanoparticles may form a barrier coating at locations of components that may come into contact with other components. For example, as described with respect to FIGS. 1-3, the coating may be applied to surface of a fir tree recess 18 of a gas turbine engine disk 12. In some examples, the coating may be applied to surfaces of other components that may come into contact with a second component. FIG. 4 is a conceptual and schematic block diagram of a system 50 including a first component 52 and a second component 58 that may come into contact with each other.

First component 52 includes a substrate 54 and a coating 56 on substrate 54. Coating 56 includes oxide nanoparticles in an oxide matrix, and may include coating 34 of FIG. 2 or coating 54 of FIG. 3.

Substrate 54 may include any of the materials described above with respect to FIG. 2. For example, substrate 54 may include a superalloy, such as a Ni-based, Co-based, Ti-based, or Fe-based superalloy. As other examples, substrate 54 may include a ceramic material or CMC material. In some examples, in which substrate 64 includes a ceramic material or CMC material, the ceramic material or CMC material may include silicon, either alone or in a compound (e.g., SiC, $Si_3N_4$, or the like).

Second component 58 also may include any of the materials described above with respect to FIG. 2 for substrate 32. For example, second component 58 may include a superalloy, such as a Ni-based, Co-based, Ti-based, or Fe-based superalloy. As other examples, second component 58 may include a ceramic material or CMC material. In some examples, in which second component 58 includes a ceramic material or CMC material, the ceramic material or CMC material may include silicon, either alone or in a compound (e.g., SiC, $Si_3N_4$, or the like). Although not shown in FIG. 4, in some examples, second component 58 may include a coating on a substrate.

Substrate 54 of first component 52 and second component 58 may include different chemical compositions. In some examples, substrate 54 may include a superalloy and second component 58 may include a ceramic or a CMC. For example, substrate 54 may include a Ni-based superalloy and second component 58 may include a ceramic of a CMC including Si. In other examples, substrate 54 may include a ceramic of a CMC and second component 58 may include a superalloy. For example, substrate 54 may include a ceramic of a CMC including Si second component 58 may include a Ni-based superalloy.

Coating 56 may reduce or substantially prevent ingress, such as through diffusion, of silicon from the ceramic or the CMC into the superalloy. In some examples, at relatively high operating temperatures (e.g., greater than about 1400° F. (about 760° C.)) and after relatively long times (e.g., greater than about 10,000 hours, nickel and silicon may react and degrade properties and performance of a Ni-based superalloy. Thus, by reducing or substantially preventing ingress of Si into the superalloy, coating 56 may extend a useful life of the superalloy.

In some examples, system 50 including first component 52 and second component 58 may be components of a high temperature mechanical system, such as a gas turbine engine. For example, a CMC blade track may be held by a metallic component, a hybrid turbine vane may include a CMC airfoil and metallic end walls, or a CMC blade may be held by a nickel disk alloy turbine disk.

Figure 5:
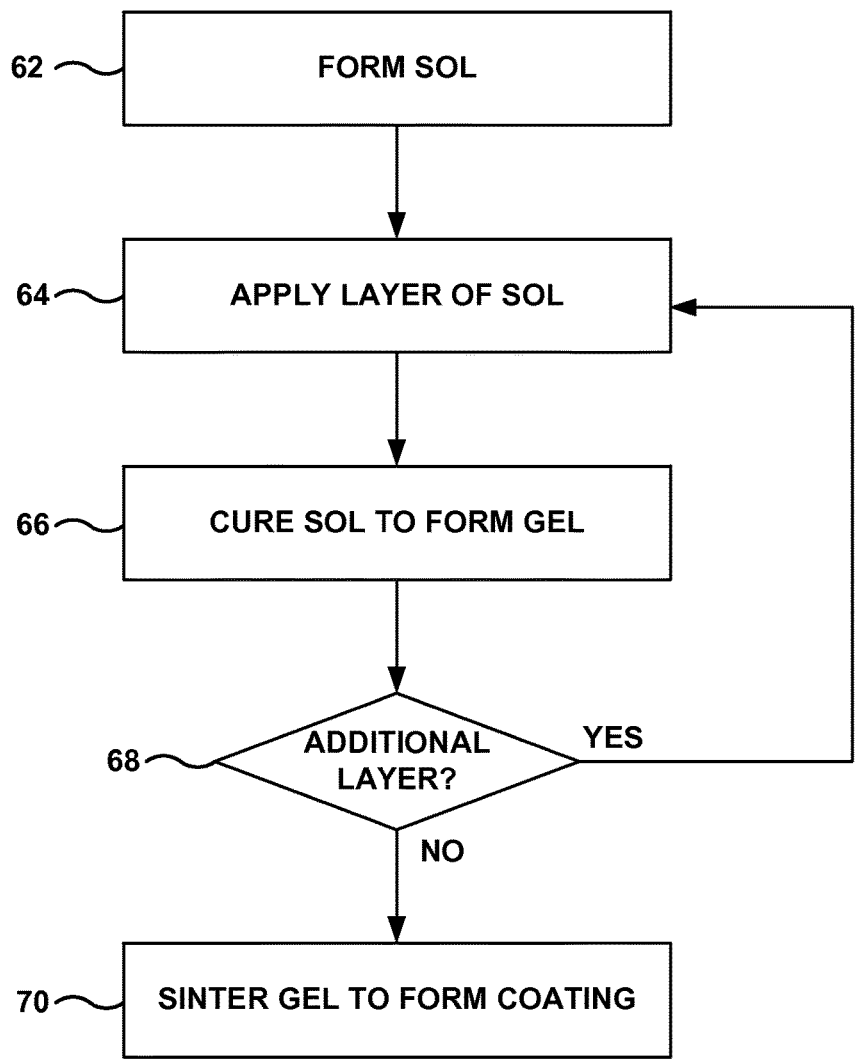
FIG. 5 is a flow diagram illustrating an example technique for forming a coating using a sol-gel.

In some examples, coating 34, 44, and 56 may be formed using a sol-gel coating technique. FIG. 5 is a flow diagram illustrating an example technique for forming a coating 34, 44, 56 using a sol-gel. The technique of FIG. 5 optionally may include forming a sol is including precursors of the coating materials, such as a precursor of the matrix material, in a solvent (62). In other examples, the sol may be previously formed. The precursors of the coating materials may be relatively small molecules or particles, and may be in a form that may form a gel upon further processing. Example coating precursors may include zirconium butoxide, methyltrimethoxysilane, and the like. In some examples, zirconium butoxide and methyltrimethoxysilane may be mixed with an organic solvent that evaporates relatively easily, such as isopropyl alcohol or ethanol, and, optionally, acetylacetone in a sol for forming a coating including a matrix that includes silica and zirconia. In some examples, the sol may include additional materials that facilitate formation of the gel, such as a crosslinking agent, a catalyst, a chemical modifier, such as acetylacetone (which may affect the reaction rate of precursors in the sol), or the like.

The sol also may include oxide nanoparticles. In some examples, the sol including the oxide matrix material precursors may be mixed first, then a suspension of oxide nanoparticles may be added to the sol prior to applying the sol to substrate 32. In some examples, the suspension of oxide nanoparticles may include the oxide nanoparticles, a solvent, and, optionally, a dispersant. In some examples, the solvent may be the similar to or substantially the same as the solvent in the sol. For example, the suspension of oxide nanoparticles may include isopropyl alcohol as a solvent. In some examples, the dispersant may include polyethyleneimine.

The sol may be mixed with the suspension of oxide nanoparticles in a predetermined ratio. The ratio may be determined based on a desired volume fraction of oxide nanoparticles in the final layer of coating 34, 44, and 56.

The sol mixture may be applied to the substrate 32 using, for example, air spraying, spin coating, or dip-coating (64). The sol mixture may be applied in a layer of a predetermined thickness, which may be substantially the same as the thickness of the layer (e.g., a layer of layers 46-48 of coating 44). In some examples, the thickness of the layer may be greater than the thickness of the coating layer to be formed, as the layer may shrink when cured due to removal of solvent.

In some examples, after applying a layer of the sol mixture, the layer may optionally be cured to form the gel (66). For example, the layer may be cured at a temperature between about room temperature and about 200° C. for up to about three hours. In some examples, the layer may be cured at a temperature of about 150° C. for about 15 minutes. The curing may remove substantially all of the solvent(s) from the layer, and, in some examples, may reduce or substantially eliminate cracking of the layer or coating 44.

In some examples, as described above, coating 44 may include a plurality of layers 46-48. For each layer of the layers 46-48, the sol may be applied (64) and cured (66) before depositing the next layer of layers 46-48.

Once at least some of the layers 46-48 have been formed (or a single layer in the case of coating 34) (the "YES" branch of decision block 68), the layers 46-48 may be sintered to form coating 34, 44, or 56 (70). For example, once all of the layers 46-48 have been deposited, the layers 46-48 may be sintered at a temperature between about 600° C. and about 1000° C. for between about 1 hour and about 5 hours. As another example, once at least one layer (e.g., one layer or five layers) have been deposited, these layers may be sintered, then additional layers may be deposited, cured, and sintered. In some examples, sintering some layers prior to depositing additional layers may facilitate formation of a thicker coating. In some examples, the layers 46-48 may be sintered at a temperature of about 700° C. or about 800° C. for about 1 hour. Sintering may result information of coating 34, 44, or 56 including an oxide matrix and a plurality of oxide nanoparticles.

EXAMPLES

Example 1

A coating was deposited on a 1" diameter RR1000 coin using spin coating. The matrix material was prepared as a sol using a sol-gel technique. The solvent for the sol was isopropyl alcohol (IPA), which was mixed with acetylacetone, a chemical modifier, prior to the addition of zirconium butoxide (ZrB), a zirconium precursor. ZrB was then added into the solution, followed by methyltrimethoxysilane (MTMS) while the mixture was stirred. The molar ratio of acetylacetone to ZrB was 0.25:1. The molar ratio of IPA to ZrB was 140:1 and the molar ratio of IPA to MTMS was 19.5:1, such that the final matrix material in the deposited coating was 10 mol % $ZrO_2$ in $SiO_2$. After all the constituents were added, the mixture was mixed for 15 minutes. De-ionized water (DI water) was then added to promote hydrolysis of methoxy groups from the MTMS and butoxide groups from the ZrB to allow free metal hydroxides to condense to form a gel. The molar ratio of DI water to total ZrB+MTMS was 5:1. The mixture including the DI water was mixed for 3 minutes, then the mixing was stopped. The sol was aged in an enclosed container for about 24 hours.

A suspension of yttria stabilized (YSZ) nanoparticles with a nominal diameter of about 90 nm was also prepared. IPA solvent was mixed with polyethyleneimine (PEI), a dispersant. The concentration of PEI in the mixture was 0.5 wt. %. YSZ particles were then added to the IPA and PEI mixture to a concentration of 29.5+/−0.5 wt. %. The mixture was milled in a baffled bottle with zirconia milling media for at least 18 hours at about 140 rpm to break down agglomerates of nanoparticles in the as-received condition. The suspension was then sonicated using a horn sonifer at an amplitude of 60% for about 38 minutes in an ice bath. About 205.2 μL YSZ suspension per mL of sol was mixed to form the final mixture used to form the coating. This resulted in a concentration of YSZ nanoparticles in the mixture of about 7.5 vol. % particles, based on the total volume of the particles, MTMS, and ZrB.

Prior to spin coating, the final mixture was pipetted onto the RR1000 coin until the coin was covered with the final mixture. The RR1000 coin was then spun at 2000 rpm for 30 seconds. The acceleration was 800 rpm per second. The spun film was cured at a temperature of about 150° C. for about 15 minutes. Five layers were applied in this manner. After applying the fifth layer, the film was sintered at a temperature of about 700° C. for about 1 hour. The resultant coating was crack free.

Various examples have been described. These and other examples are within the scope of the following claims.

The invention claimed is:

1. A gas turbine engine disk comprising:
   a substrate defining at least one fir tree recess; and
   a coating on surfaces of the at least one fir tree recess wherein the coating is selectively not on surfaces of the gas turbine disk other than the surfaces of the at least one fir tree recess, and, wherein:
   the coating comprises a layer comprising an oxide matrix and a plurality of oxide nanoparticles;
   the oxide matrix comprises at least one of silica, zirconia, alumina, titania, or chromia;
   the plurality of oxide nanoparticles comprises at least one of yttria, zirconia, alumina, or chromia;
   a chemical composition of the plurality of oxide nanoparticles is different from the chemical composition of the oxide matrix such that the plurality of oxide nanoparticles forms a second, distinct phase in the oxide matrix;
   an average diameter of the plurality of oxide nanoparticles is less than 400 nm; and
   the layer is formed from a mixture comprising a precursor of the oxide matrix and between about 0.7 volume percent and about 13 volume percent of the plurality of oxide nanoparticles, wherein the volume percent of the plurality of oxide nanoparticles is based on the volume of nanoparticles divided by a total volume of nanoparticles plus the precursor of the oxide matrix.

2. The gas turbine engine disk of claim 1, wherein the mixture comprises between about 5 volume percent and about 7.5 volume percent of the oxide nanoparticles, based on the volume of oxide nanoparticles divided by a total volume of oxide nanoparticles plus a precursor of the oxide matrix.

3. The gas turbine engine disk of claim 1, wherein the oxide matrix comprises silica and zirconia.

4. The gas turbine engine disk of claim 1, wherein the plurality of oxide nanoparticles comprise zirconia stabilized with at least one of yttria, alumina, or chromia.

5. The gas turbine engine disk of claim 1, wherein the coating comprises a plurality of layers, each layer of the plurality comprises the oxide matrix and the plurality of oxide nanoparticles.

6. The gas turbine engine disk of claim 5, wherein the coating comprises between 3 and 10 layers.

7. The gas turbine engine disk of claim 1, wherein the coating defines a thickness of between about 1 micrometers and about 10 micrometers.

* * * * *